July 3, 1934.    L. G. BLACK    1,964,902
PROCESS OF PRODUCING CRYSTALLINE ANHYDROUS BORAX
Original Filed March 7, 1931    2 Sheets-Sheet 1

Inventor
Leroy G. Black
By Lyon & Lyon
Attorneys

July 3, 1934. L. G. BLACK 1,964,902
PROCESS OF PRODUCING CRYSTALLINE ANHYDROUS BORAX
Original Filed March 7, 1931 2 Sheets-Sheet 2

Inventor
Leroy G. Black
By Lyon & Lyon
Attorneys

Patented July 3, 1934

1,964,902

UNITED STATES PATENT OFFICE 1,964,902

PROCESS OF PRODUCING CRYSTALLINE ANHYDROUS BORAX

Leroy G. Black, Trona, Calif., assignor to American Potash & Chemical Corporation, Trona, Calif., a corporation of Delaware Original application March 7, 1931, Serial No. 520,969. Divided and this application April 28, 1934, Serial No. 722,987

18 Claims. (Cl. 23—59)

This invention relates to a process of crystallizing anhydrous borax.

This application is a division of my copending application, Serial No. 520,969, filed March 7, 1931.

The ordinary borax of commerce ($Na_2B_4O_7.10H_2O$)

contains a large water content, and in marketing such borax an appreciable element of cost is the freight charge due to the necessity of shipping this water of crystallization. For certain purposes, it is also desired that a water-free anhydrous borax be provided. Heretofore, when borax has been dehydrated generally a product known as borax glass has been produced. This product has the disadvantage in that it is extremely difficult to drive out the last water of crystallization and the product is extremely hard and very difficult to grind.

The hardness characteristic of borax glass has, to the knowledge of the present inventor, no advantage in subsequent uses, but has resulted in several rather serious disadvantages. In the first place, in order to comminute the product, extremely heavy equipment has been required and the upkeep on this equipment has been a large factor in determining the costs of anhydrous borax production. In addition to this undesirable feature of high maintenance on grinding equipment, the borax glass when ground seriously abrades the steel grinding surfaces and a considerable amount of undesirable iron (both in the form of scale and solid metallic particles) has found its way into the resultant products. Such contamination is undesirable in certain instances, such as where anhydrous borax is to be used in the enameling and glass-making industries. A further disadvantage of the hard nature of vitreous borax produced by past practice is that it is difficult to comminute the same to a particular desired screen size. If borax glass is sufficiently ground in the average mill to eliminate the undesirable over-sized material, then considerable undesirable under-sized material invariably results.

It is the general object of the present invention to produce an anhydrous borax which is crystalline in form and friable or easily comminuted. It has been discovered that, by proper control of the dehydration of borax or other hydrated tetraborates, when the borate compound approaches the anhydrous state but before it reaches a completely anhydrous state, it can be caused to cystallize entirely as anhydrous borax in a friable, easily comminuted form, at the same time driving out of the mass being dehydrated the last trace of water which is ordinarily so difficult to remove in the process of producing borax glass.

It is a further object of the present invention to provide an anhydrous borax which may be comminuted or ground without serious abrading of the grinding surfaces of the grinding equipment so that the resulting product will be substantially free of iron, and it is a further object of the present invention to produce a crystalline anhydrous borax which may be comminuted to a particular screen size without producing an appreciable quantity of over-sized or under-sized material.

The present invention, therefore, includes a process for producing anhydrous borax by which borax can be reduced to a completely anhydrous state in a more simple and economical manner. The present invention also provides a process by which an anhydrous borax may be produced which is more readily comminuted.

The present invention, together with various additional objects and advantages thereof will best be understood from the description of a preferred form of a process for producing crystalline anhydrous borax embodying the present invention.

The process of the present invention will be most clearly understood from a description of a preferred apparatus in which the process may be carried on, said apparatus being illustrated in the accompanying drawings, in which—

Figure 1:
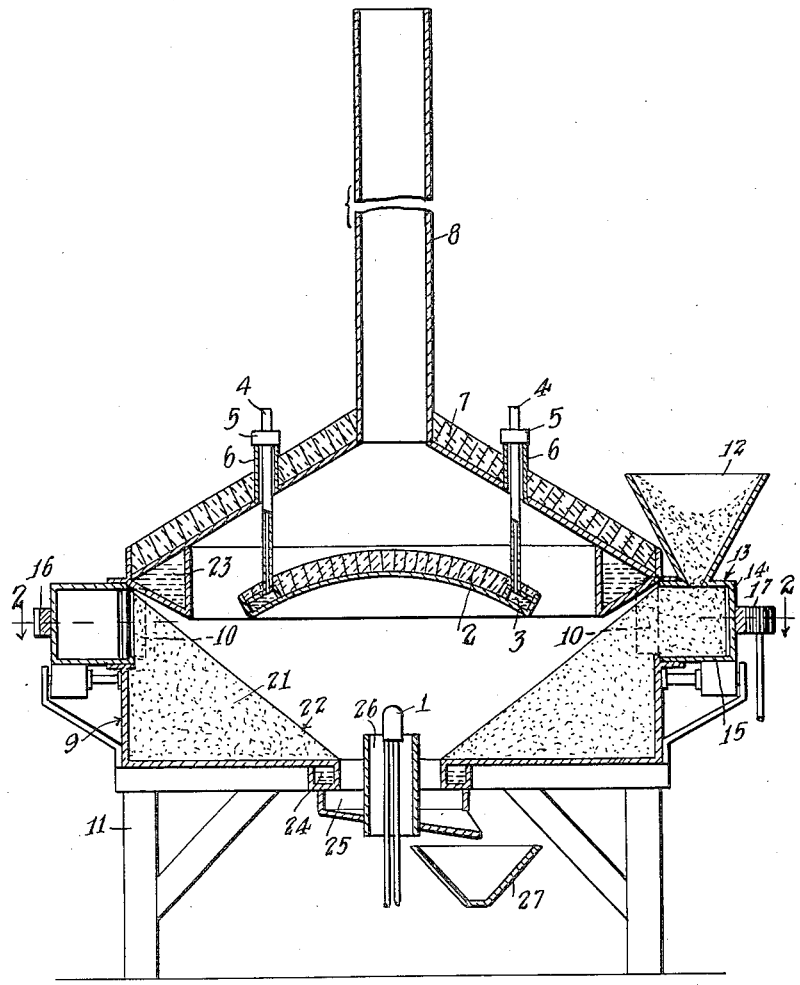
Figure 1 is an elevation mainly in vertical section.
Figure 2:
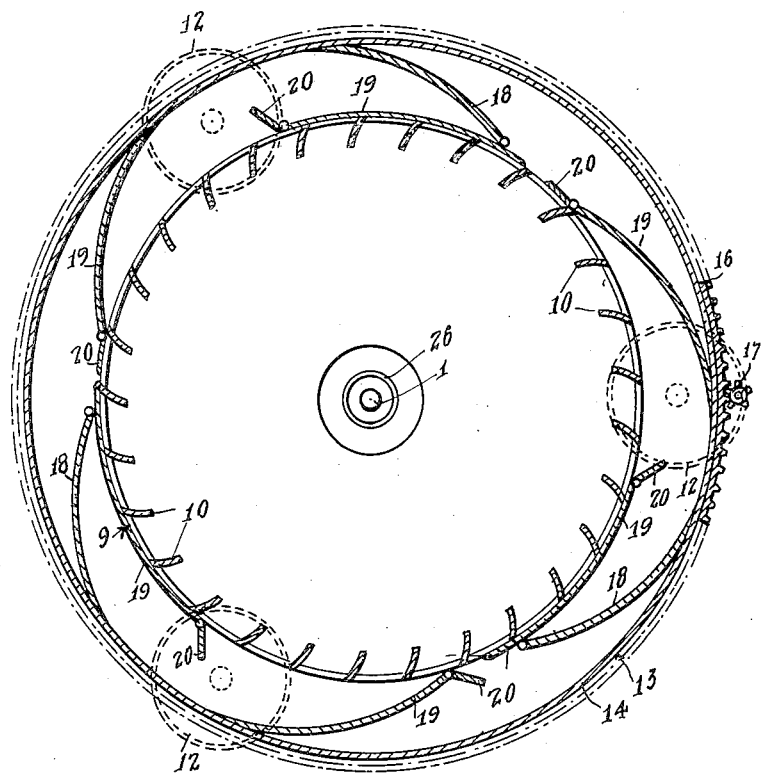
Figure 2 is a horizontal section mainly along the line 2—2.

In the preferred form of the process a hydrated tetraborate compound is subjected to dehydration by heating the compound in a suitable furnace. While in certain cases it may be desired to introduce the ordinary borax or sodium tetraborate decahydrate, any of the partially hydrated tetraborates may be employed. It is preferred in the process to charge into the furnace a hydrated tetraborate corresponding to the monohydrate.

In the dehydrating furnace the hydrated tetraborate is heated to drive off the water of hydration until it has been sufficiently dehydrated so as to reach a molten condition and it may be heated to somewhat higher temperatures in operation. At the time the borate compound reaches the molten state, all but a minor amount of water has been driven off. The remaining traces of water are removed with extreme difficulty and in ordinary practice a pool of the molten borate material is subjected to a high temperature for substantial periods of time in order to drive out the residual water, and as a result there is finally produced a product known as borax glass which has no crystalline structure and which is extremely hard and dense. This product can be comminuted or ground only with extreme difficulty and with a high cost for depreciation of the grinding apparatus.

In accordance with this invention, substantially as soon as the borate material has been reduced to the molten condition and rendered fluid or readily pourable, it is run out of the furnace into molds wherein it is permitted to cool. It has been found that when the fluid borate material is poured into molds in this condition and permitted to cool, it simultaneously crystallizes and the residual water of hydration causes the mass to expand, producing a somewhat porous mass of crystals of anhydrous borax which is apparently entirely free of water. In referring to the melting of borax or the molten condition, I have reference to the true fusion or melting of borax, such as takes place at about 700° to 800° C., rather than the solution of borax in its water of crystallization, which sometimes takes place at about 100° C. when it is sought to dehydrate the decahydrate.

The crystalline anhydrous borax thus produced is what may be termed in a "friable state", that is, it is easily broken up and may be broken up by the hand into relatively small borax crystals, such, for example, as would be retained between the 20 and 150 mesh screens, i. e. of average size from 1.0 mm. to 0.10 mm.

In operating the furnace for the production of the crystalline anhydrous product it is important that one avoids subjecting the molten borax to the high temperature for long periods of time. For this reason, I operate the furnace in such manner as to retain a relatively small charge undergoing treatment therein and feed the material continuously into the furnace and continuously remove the same.

I have also found it an advantage to utilize the borate material itself as a protection or lining for the furnace walls. In running the molten borax into molds for crystallizing, I prefer to employ a mold which allows expansion upwardly in order to permit the free expansion of the material in the crystallizing operations.

Now referring particularly to the drawings, 1 represents a burner which may be any usual or preferred burner, preferably utilizing fluid fuels such as oil or gas. This burner projects a flame against a refractory brick arch 2, which arch is protected from erosion by water jacket 3 and is suspended by a number of water-cooled tubes 4. Preferably, means are provided by which the position of the refractory arch 2 in the furnace may be adjusted, such as nuts 5 having bearing on the reinforced section 6 of a refractory cone top wall 7 of the furnace. A flue 8 is provided in the apex of the top wall of the furnace and is supported thereby.

The refractory brick cone 7 providing the top wall of the furnace is supported through side walls 9 of the furnace, which may be of metal or brick and which are preferably cylindrical in form. The side walls 9 have a plurality of feeding ports and vanes 10. The entire furnace is supported on the frame 11, which may take any desired form.

A plurality of feeding hoppers 12 are provided, preferably three in number, of which one appears in Figure 1. These feeding hoppers in practice are filled with borate material, which is to be dehydrated and crystallized and permits this material to flow by gravity into a rotating feeder 13. The feeder 13 comprises a cylindrical outer wall 14 and an annular bottom wall 15, the inner wall open for communication with the feeding ports in the side walls 9 of the furnace. The outer wall 14 of the feeder is provided with a gear 16 by means of which it may be driven by the pinion 17.

The feeder 13 is also provided with force feeding vanes 18. These vanes are attached at one end to the outer side walls of the feeder and curved inwardly to the inner edge of the feeder and are fixed in position by being welded or otherwise secured to the bottom walls 15 of the feeder.

The side wall of the furnace has a plurality of doors 19, each of which is adapted to close a plurality of ports leading to the furnace chamber and the doors are pivoted to the side walls and provided with operating extensions 20 which are adapted for engagement with the force feeding vanes 18 of the feeder to be opened thereby during the motion of the feeder 13.

After entering the furnace, the borate material builds up a bed 21 in the shape approximating an inverted cone eventually reaching the angle of repose of the material as shown by the surface 22. The furnace is now ready for continuous operation.

As further borate material is fed or charged into the furnace, it is protected from the hot gases within the furnace for a short time by a water jacket 23, after which it passes by gravity into the melting zone. The borate material being melted in the furnace passes rapidly down over a water jacket 24 into a collector 25, which has a vertical tube 26 and a bottom wall which inclines towards a mold 27.

The furnace is operated so as to maintain continuously the embankment of borate material 21 and only a small amount of material in the furnace reaches a molten condition at one time. This insures that the material, as soon as it reaches a molten condition, will be rapidly discharged from the furnace, preventing baking of the same for protracted periods of time. Apparently, the avoidance of prolonged heating of the borate material after it has reached the molten condition is an important element in securing crystallization of the anhydrous borax. It also appears that by melting the borate material as herein described and passing the borate material immediately out of the melting zone and having the molten material in contact with unmolten semi-dehydrated borate material 21, there are introduced in the molten mass certain crystal nuclei originating from the semi-dehydrated raw material. These crystal nuclei induce rapid crystallization of the mass after it is withdrawn from the furnace.

In operation of the process of the present invention, the slope 22 of the bed 21, the degree of firing and the rate of feed are adjusted so that the material leaving the furnace will obtain a satisfactory fluidity, but will not have been unduly heated or maintained at high temperatures over long periods of time. In this feature, the melting of the present invention differs materially from the furnaces of past practice, wherein a pool of molten material is held at high temperatures for prolonged periods.

The crystalline anhydrous borax produced by the process of this invention, when crushed and sacked, has a weight of approximately 150 pounds per sack as compared with a weight of 115 pounds which results when common borax (sodium tetraborate dekahydrate) is sacked. Moreover, in comparison with the dekahydrate, a sack of the crystalline anhydrous borax contains approximately 150 pounds of $Na_2B_4O_7$ as compared with 60.5 pounds of $Na_2B_4O_7$ in a sack of sodium tetraborate dekahydrate.

The crystallization of the molten borax apparently takes place at or just below the melting point. It is preferred in the crystallizing operation that the cooling be conducted relatively slowly in order to prevent the formation of glass. It also appears that the crystallizing operation will not always take place spontaneously. Generally, the mass may be caused to crystallize by agitation, particularly when the mass is seeded in any way. I generally do not find that it is necessary to add seeds of borax crystals to the mass, for the crystallization will be caused to take place on account of seeding from borax dust in the atmosphere or from the furnace.

While in certain cases it may be desirable to subject the molten material which is undergoing slow cooling to mechanical agitation in order to start the crystallization, in other cases the crystallization may be started without mechanical agitation due to seeding of the mass either from the air or from the residual crystals of anhydrous sodium tetraborate remaining in the molds, or added deliberately. Where crystallzation is permitted to start from seeding of the mass either from seeds deliberately added or otherwise brought into contact with the mass, sufficient agitation to cause complete crystallization of the entire mass is generally secured due to the agitating effect of the final water from the mass which is liberated in the crystallizing operation and agitates the mass by expanding the same.

Since the crystallization of the molten borax takes place at or close to the melting point, it has been found that the crystallization operation is facilitated by having the borate material very close to the melting point when it is run into the molds. Then there is present a large body of molten material to be crystallized, and this material is just at the melting point or temperature of crystallization. Once crystallization commences, the whole mass will rapidly undergo crystallization; whereas, if the material is at too high a temperature, when run into the molds, crystallization may be difficult to effect and in some cases borax glass will result.

After crystallization sets in within the molten mass, there are produced anhydrous sodium tetraborate crystals and the crystallation of the entire mass becomes complete in less than an hour. I have discovered that these anhydrous sodium tetraborate crystals are hydrophobic, that is, they will not tolerate any water in their crystal structure. Consequently, as the material crystallizes, the residual water of the molten mass is liberated. This liberation of water is instrumental in effecting the desired production of a friable crystalline anhydrous borax. It is to be noted that this anhydrous borax has a tendency to be hygroscopic at normal atmospheric temperatures.

Since crystallization takes place at a relatively high temperature (about 720° C.) the water liberated at this temperature must exist in the vapor phase. The liberation of this water tends to stir the crystallizing molten magma to a considerable extent and results in the production of an extremely friable aggregate. However, the anhydrous sodium tetraborate crystals are not in any way porous, but on the contrary comprise a more dense material than the corresponding borax glass. The stirring action of the water liberated from crystallization of the anhydrous borax not only serves the aforedescribed valuable purpose, but likewise plays an important role in insuring complete crystallization. If an attempt is made to crystallize borax from a molten mass which has been completely dehydrated, not only is crystallization difficult to commence but the product comprises densely matted clusters of very minute needles. The development of these crystals is slow, so that many hours are occupied in their formation. Furthermore, a great part of the mass remains as borax glass after the completion of the operation.

The crystallization of anhydrous sodium tetraborate has been found to be rather strongly exothermic. As a result, the molten magma in which crystallization may commence at or below 720° C. may easily be maintained in a plastic state until crystallization has been completed. By preventing undue radiation losses from the molds or like equipment, very little difficulty is encountered in entirely preventing the formation of a vitreous product, thereby insuring complete crystallization of the entire mass.

One explanation as to why the crystallization process of the present invention is so complete while other methods of crystallizing anhydrous sodium tetraborate produce an incompletely crystallized product, may reside in the fact that the water present in the mass undergoing crystallization tends to compensate for the heat of crystallization and keep the mass undergoing crystallization at the optimum crystallizing temperature. It appears that crystallization of the mass best proceeds at a temperature commencing at about 720° C. If there were no water in the mass undergoing crystallization, the heat of crystallization would raise the temperature of the mass rapidly above this temperature. When there is a residual water of hydration in the mass undergoing the crystallization operation, the heat of vaporization of this water compensates for the heat of crystallization and tends to maintain the desired optimum crystallizing temperature.

Nearly all borax of commerce contains rather minute quantities of organic matter and this organic matter, unless completely consumed, results in a darkened product, which is rather unpleasing to the eye. However, by the method of this invention, there is produced a crystalline product which of itself very materially masks the dark color. In order to obtain a product of absolute whiteness at the relatively low temperatures employed in this process, I have found it advantageous to introduce with the raw material entering the fusion furnace a minute quantity of a suitable oxidizing agent. One of the most suitable materials from the standpoint of effectiveness and cheapness has been found to be sodium nitrate. The addition of 0.01% to 0.10% commercial sodium nitrate has been found to be an excellent medium for producing a snow-white crystalline anhydrous borax.

The crystalline product produced is found to be fairly hygroscopic in that the surface of a mass of crystals will slowly absorb water and lose the crystalline character of the particles.

While the particular form of invention herein described is well adapted to carry out the objects of the invention, various modifications and changes may be made without departing from the spirit of the invention, and the invention is of the scope set forth in the appended claims.

I claim:

1. A process of producing an anhydrous crystalline sodium tetraborate, which comprises heating hydrated sodium tetraborate until the fused state is reached, then permitting the molten borate material to cool slowly while inducing crystallization within the fused mass.

2. A process of producing anhydrous sodium tetraborate, which comprises heating a hydrated sodium tetraborate while driving off water of hydration until the fused state is reached, and then permitting the fused borate material to cool while inducing crystallization of the mass, whereby the last of the water from the borate material is removed in the crystallizing operation, thereby producing a porous friable mass of anhydrous sodium tetraborate.

3. A process of producing anhydrous crystalline sodium tetraborate which comprises heating hydrated sodium tetraborate while driving off water of hydration until the molten state is reached, and then promptly removing the molten borate material from the source of heat and permitting the same to cool, and inducing crystallization in the cooling mass of borate material.

4. A process of producing crystalline anhydrous sodium tetraborate, which comprises heating hydrated sodium tetraborate while driving off water of hydration until the molten state is reached, then rapidly removing the molten borate material from the source of heat, permitting the same to slowly cool and inducing crystallization in the molten mass, the crystallization operation being allowed to proceed so that substantially the entire mass of borate material is crystallized, the residual water simultaneously liberated from the mass and the mass permitted to expand, resulting in a porous friable mass of anhydrous borax crystals.

5. A process of producing crystalline anhydrous sodium tetraborate, which comprises dehydrating hydrated sodium tetraborate until the molten condition is reached, then before the last water of hydration is driven out of the molten mass, withdrawing the mass from the source of heat and passing the same into a crystallizing zone, therein permitting the mass to cool slowly while inducing crystallization, and permitting the crystallization to continue, whereby the remaining water is driven out of the mass, until substantially the entire mass is crystallized into a porous body of anhydrous borax crystals.

6. A process of producing crystalline anhydrous sodium tetraborate, which comprises dehydrating a hydrated sodium tetraborate or driving off water until the temperature of approximately 720° C. is reached and the mass is reduced to a fluid condition, then before driving off the final water of hydration, withdrawing the molten borate material from the source of heat and permitting the same to cool slowly in molds while agitating the same, thereby inducing crystallization of the mass and causing the residual water to be liberated.

7. A process of producing anhydrous crystalline sodium tetraborate, which comprises adding a small amount of oxidizing agent to a hydrated sodium tetraborate, heating the same while driving out the water until the mass reaches the molten condition, and then before the last water of hydration is driven out of the molten mass, withdrawing the mass from the source of heat and causing the mass to crystallize and thereby to simultaneously expel the last of the water, thereby forming a porous mass of anhydrous borax crystals.

8. A process of dehydrating borax, which comprises first partially dehydrating the borax, then passing the partially dehydrated borax into a heating zone wherein it is rapidly heated with further dehydration until it reaches the molten condition, then rapidly withdrawing the molten borate material from the heating zone before the last water of hydration is driven out of the molten mass, passing the molten borate material into moulds wherein it is permitted to cool slowly, and agitating the mass in the molds to induce crystallization, whereby the crystallization of the mass proceeds simultaneously with the expulsion of the residual water forming a porous mass of anhydrous sodium tetraborate crystals.

9. A process of producing anhydrous crystalline sodium tetraborate, which comprises heating hydrated sodium tetraborate until the fused state is reached and the mass is close to the temperature of crystallization of anhydrous sodium tetraborate, and thereafter cooling the mass slowly in contact with particles of hydrated sodium tetraborate until crystallization proceeds throughout the mass.

10. A process of producing anhydrous crystalline sodium tetraborate, which comprises heating hydrated sodium tetraborate until the fused state is reached and the mass is close to the temperature of crystallization of anhydrous sodium tetraborate, and thereafter cooling the mass slowly in contact with particles of solid sodium tetraborate until crystallization proceeds throughout the mass, the cooling being commenced before all of the residual water is removed from the fused mass whereby this last residual water is driven off simultaneously with the crystallization of the mass producing a friable porous product.

11. A process of dehydrating hydrated sodium tetraborate, which comprises passing the hydrated sodium tetraborate material into a heating zone to drive off water and reduce the same to a molten condition, and withdrawing the molten borate from the heating zone when it is reduced to the molten condition, and permitting the molten material to slowly cool while inducing crystallization.

12. A process of dehydrating hydrated sodium tetraborate, which comprises passing the hydrated sodium tetraborate material down a sloping embankment of tetraborate material, radiating heat against such hydrated sodium tetraborate material to drive off water and reduce the same to molten condition, withdrawing the molten borate material from the embankment as it is reduced to the molten condition, and passing the molten material into a mould and inducing crystallization.

13. A process of dehydrating sodium tetraborates, which comprises forming a sloping embankment of partially dehydrated sodium tetraborates, radiating heat against the surface of said embankment, passing hydrated sodium tetraborate material down said embankment, while driving off water of hydration from the same until the molten state is reached, discharging the molten borate material from the embankment as it reaches the molten condition, and passing the molten material into moulds and therein slowly cooling the material while inducing crystallization.

14. In a process of producing crystalline anhydrous sodium tetraborates, which comprises first partially dehydrating borax, then passing the partially dehydrated borax down a sloping embankment of borate material, radiating heat against the material passing down said embankment, while driving off water until the same is reduced to the molten condition, then before the last of the water is driven off, withdrawing the mass from the embankment and source of radiating heat and permitting the same to cool slowly while inducing crystallization thereof with an expansion of the mass due to the expulsion of the residual water.

15. A process of crystallizing sodium tetraborate material, which comprises heating the sodium tetraborate material while driving off water until the molten condition is reached, passing the molten material over partially hydrated solid sodium tetraborate material into molds, permitting the material to cool slowly, whereby crystallization of substantially the entire mass of sodium tetraborate takes place while the last of the water is liberated, expanding the mass.

16. A process of dehydrating hydrated sodium tetraborates, which comprises heating sodium tetraborate monohydrate in a melting zone, and causing the material to pass downwardly over a bed of partially dehydrated sodium tetraborate while subjecting the material to radiant heat sufficient to produce the fused condition, withdrawing the molten material from the heating zone as the same is produced, and cooling the mass slowly to permit crystallization thereof.

17. A process of producing crystalline anhydrous sodium tetraborate, which comprises heating sodium tetraborate to produce a fused mass, removing the fused mass from the heating zone soon after the fused state is reached and inducing crystallization within the fused mass.

18. A process of producing crystalline anhydrous sodium tetraborate, which comprises fusing hydrated sodium tetraborate in contact with a surface of unfused tetraborate material, removing the fused mass from the fusion zone soon after the fused state is reached, simultaneously inducing crystallization and cooling the same slowly to permit crystallization thereof.

LEROY G. BLACK.